United States Patent
Harada et al.

[11] Patent Number: 5,491,392
[45] Date of Patent: Feb. 13, 1996

[54] POWER SOURCE REGENERATIVE APPARATUS

[75] Inventors: Takashi Harada; Eiichi Sasuga, both of Minamitsuru, Japan

[73] Assignee: Fanuc Ltd., Yamanashi, Japan

[21] Appl. No.: 211,273

[22] PCT Filed: Jul. 30, 1993

[86] PCT No.: PCT/JP93/01084

§ 371 Date: Mar. 25, 1994

§ 102(e) Date: Mar. 25, 1994

[87] PCT Pub. No.: WO94/03966

PCT Pub. Date: Feb. 17, 1994

[30] Foreign Application Priority Data

Aug. 6, 1992 [JP] Japan .................... 4-210375

[51] Int. Cl.$^6$ .................... H02P 3/14
[52] U.S. Cl. .................... 318/376; 318/459; 318/87; 318/757
[58] Field of Search .................... 318/459, 376, 318/87, 757–762; 363/40

[56] References Cited

U.S. PATENT DOCUMENTS 4,251,735  2/1981  Coleman .................... 318/757
4,560,908  12/1985  Stupp et al. .................... 318/757
4,928,052  5/1990  Fujioka et al. .................... 318/762

FOREIGN PATENT DOCUMENTS

| 0013615 | 7/1980 | European Pat. Off. . |
| 0314801 | 5/1989 | European Pat. Off. . |
| 62-104481 | 5/1987 | Japan . |
| 63-274382 | 11/1988 | Japan . |
| 4-1595 | 1/1992 | Japan . |
| 4-193072 | 7/1992 | Japan . |
| WO88/08639 | 11/1988 | WIPO . |

*Primary Examiner*—William M. Shoop, Jr.
*Assistant Examiner*—Karen Masih
*Attorney, Agent, or Firm*—Staas & Halsey

[57] ABSTRACT

The present invention relates to a power source regenerative apparatus which prevents distortion of a voltage regenerating in the power source from being caused. An inverter transforms induction electromotive force caused in regenerating the power source, namely in decelerating the motor, into a direct current. A timing adjusting device outputs a regenerative signal ST at a predetermined timing before the potential of one phase indicative of the maximum potential in three-phase supply voltages becomes the same potential as that of another phase. Based on the regenerative signal ST, a converter converts the transformed direct current into an alternating current, and regenerates it to the power source.

2 Claims, 15 Drawing Sheets

POWER SOURCE REGENERATIVE APPARATUS

BACKGROUND OF THE INVENTION

1. Field of the Invention

The present invention relates to a power source regenerative apparatus, and in particular, to a power source regenerative apparatus which regenerates induction electromotive force caused in decelerating a motor to a power source.

2. Description of the Related Art

In decelerating a motor, the motor is operated as a generator, thereby regenerative braking is executed. Such an apparatus for controlling the aforesaid regenerative braking has been generally known as a power source regenerative apparatus. According to a conventional power source regenerative apparatus, after a regenerative current of a certain interphase becomes zero, the regenerative current flows into the next interphase.

FIG. 10 is a time chart showing an on/off state of transistors of a conventional converter, showing a change for every time of transistors Tr1 through Tr6, which corresponds to a change of a supply voltage. (Incidentally, a circuit of the converter is as shown in FIG. 11.) In FIG. 10, transistors Tr1, Tr3 and Tr5 turn the phase indicative of the maximum potential in three-phase (R-phase, S-phase, T-phase) supply voltage to an on-state. On the other hand, transistors Tr2, Tr4 and Tr6 turn the phase indicative of the minimum potential in the aforesaid three-phase supply voltage to an on-state.

More specifically, the transistor Tr1 becomes an on-state in the case where the potential of R-phase is the maximum, and an off-state in other cases. Likewise, the transistors Tr3 and Tr5 become an on-state in the case where the potential of S-phase and T-phase is the maximum, and an off-state in other cases, respectively. Further, the transistor Tr2 becomes an on-state in the case where the potential of R-phase is the minimum, and an off-state in other cases. Likewise, the transistors Tr4 and Tr6 become an on-state in the case where the potential of S-phase and T-phase is the minimum, and an off-state in other cases, respectively.

For example, the potential of R-phase becomes the maximum; on the other hand, the potential of S-phase becomes the minimum, between time t102 and time t103. For this reason, the transistors Tr1 and Tr4 become an on-state, and other transistors become an off-state. Likewise, the potential of R-phase becomes the maximum; on the other hand, the potential of T-phase becomes the minimum, between time t103 and time t104. For this reason, the transistors Tr1 and Tr6 become an on-state, and other transistors become an off-state.

In this case, the minimum voltage changes from the S-phase to the T-phase at the time t103, so that the transistor Tr4 becomes an off-state while the transistor Tr6 becomes an on-state with a delay of a short time Δt from time t103. Such a switching of an on/off state in a transistor is executed at each of time t101, t102, ..., t109.

FIGS. 11 through 13 are circuit diagrams showing the flow of a conventional regenerative current; FIG. 11 shows the flow of the regenerative current before the phase is switched, FIG. 12 shows the flow of the regenerative current when the phase is switched, and FIG. 13 shows the flow of the regenerative current after the phase is switched. In other words, FIGS. 11 through 13 show the flow of the regenerative current between time t102 and time t103 in FIG. 10, the flow of the regenerative current at time t103 in FIG. 10, and the flow of the regenerative current between time t103 and time t104 in FIG. 10, respectively.

First, the circuit configuration of the converter shown in FIGS. 11 through 13 will be explained below. The transistors Tr1 and Tr2 are connected in series with each other. More specifically, an emitter terminal of the transistor Tr1 and a collector terminal of the transistor Tr2 are connected with each other, and this junction point is connected to the R-phase of a power source 11 through an inductance. Likewise, an emitter terminal of the transistor Tr3 and a collector terminal of the transistor Tr4 are connected with each other, and this junction point is connected to the S-phase of the power source 11 through an inductance. An emitter terminal of the transistor Tr5 and a collector terminal of the transistor Tr6 are connected with each other, and this junction point is connected to the T-phase of the power source 11 through an inductance.

Transistors Tr1 and Tr2, Tr3 and Tr4, and Tr5 and Tr6, which are connected in series, are further connected in parallel. More specifically, collector terminals of the transistors Tr1, Tr3 and Tr5 are connected to each other, and a regenerative current limiting resistor R and a diode D are connected in parallel to the junction point. Likewise, emitter terminals of the transistors Tr2, Tr4 and Tr6 are connected with each other, and one terminal of a condenser C is connected in parallel to the junction point, as in the connection between the transistors Tr1 and Tr2, and the other terminal of the condenser C is connected to a junction point between one terminal of the aforesaid regenerative current limiting resistor R and a cathode terminal of the diode D.

In addition, a diode is connected in parallel to each of these transistors Tr1 through Tr6; for example, a cathode terminal of a diode D1 is connected to the collector terminal of the transistor Tr1, and an anode terminal thereof is connected to the emitter terminal of the transistor Tr1. Likewise, diodes D2, D3, D4, D5 and D6 are connected in parallel to the transistors Tr2, Tr3, Tr4, Tr5 and Tr6, respectively.

Next, the flow of the regenerative current at each time will be explained below.

First, a current by induction electromotive force caused in decelerating the motor (not shown) flows into both terminals of the aforesaid condenser C; for this reason, the potential of both terminals of the condenser C rises up. At that moment, the potential of one phase indicative of the maximum potential in three-phase supply voltages supplied from the power source 11 becomes lower than that of one terminal of the condenser C, and the potential of one phase indicative of the minimum potential in three-phase supply voltages supplied from the power source 11 becomes higher than that of the other terminal of the condenser C. As a result, a potential difference occurs between the supplied three-phase supply voltage and the condenser C. Further, transistors are turned ON, thereby Generating a regenerative current flowing into the power source 11 from the condenser C. The regenerative current Generated by the aforesaid phenomenon is hereinafter referred to as "regenerative current in decelerating."

In FIG. 11, the regenerative current in decelerating flows into the power source 11 as a phase current IR through the regenerative current limiting resistor R and the transistor Tr1. In this case, the potential of the T-phase is $V_T$. Further, the regenerative current in decelerating flows into the condenser C as a phase current IS through the transistor Tr4 because the potential $V_S$ of the S-phase is lower than the potential $V_T$ of the T-phase, and the transistor Tr4 is turned on.

In FIG. 12, when a counter electromotive voltage occurs in an input inductance L by turning the transistor Tr4 off, the regenerative current in decelerating flows into the power source through the transistor Tr1 and the diode D3.

In FIG. 13, the regenerative current in decelerating flows into the power source 11 as the phase current IR through the regenerative current limiting resistor R and the transistor Tr1. Further, the regenerative current in decelerating flows into the motor (not shown) as the phase current IT through the transistor Tr6 because the potential $V_T$ of the T-phase is lower than the potential $V_S$ of the S-phase, and the transistor Tr6 is turned on.

Next, the flow of the regenerative current in switching the phase, shown in FIG. 12, will be explained below.

FIG. 14 is a circuit diagram showing the conventional flow of the regenerative current in switching the phase. In the figure, an inductance L1 denotes inductance of the power source, and an inductance L2 denotes inductance of the converter. Each of potentials VR1, VS1 and VT1 denote a potential of supply voltage, and each of potentials VR2, VS2 and VT2 denote a potential of other apparatuses connected to the power source. Incidentally, the same number is given to the same element as that shown in FIG. 12, and an explanation of the same element is omitted.

The regenerative current in decelerating flows into the transistor Tr1 as a fly-wheel current IR, IS caused by counter electromotive force of inductances $L1_S$ and $L2_S$, through the diode D3.

For this reason, the potentials $V_R$ and $V_S$ are in a short-circuited state, and they become almost the same potential, so that each of them becomes an intermediate potential between the potentials VR1 and VS1. As a result, the potential VR2 becomes a potential in which a partial pressure is applied to the potentials VR1 and $V_R$ by using inductances $L1_R$ and $L2_R$, and the potential VS2 becomes a potential in which a partial pressure is applied to the potentials VS1 and $V_S$ by using inductances $L1_S$ and $L2_S$. Therefore, the interphase voltage of potentials VR2 and VS2 becomes lower than the original potential, so that a waveform of the power source is distorted.

FIG. 15 is a time chart of the conventional regenerative current, showing a change of interphase voltage and phase currents IT, IR and IS, which corresponds to a change of the supply voltage.

Distortion of the interphase voltage shown in FIG. 14 appears at each time t151, t152, . . . , t159 when the phase currents IT, IR and IS decrease. Further, the magnitude of distortion of the interphase voltage varies in accordance with a ratio of inductances L1 and L2.

For this reason, according to the conventional power source regenerative apparatus, there is a problem in that interference occurs in various apparatuses which are connected to a power source having distortion caused by regeneration as described above and which use a three-phase timing. In addition, there is a problem in that higher harmonics occur in the power source.

SUMMARY OF THE INVENTION

The present invention has been made in view of the above problems. Therefore, an object of the present invention is to provide a power source regenerative apparatus, which prevents distortion of a voltage regenerating to a power source from being generated.

To solve the above problems, the present invention provides a power source regenerative apparatus which regenerates induction electromotive force caused in decelerating a motor to a power source, comprising an inverter which transforms induction electromotive force caused in the motor in regenerating the power source into a direct current, timing adjusting means which outputs a regenerative signal at a predetermined timing before the potential of one phase indicative of the maximum potential in three-phase supply voltages becomes the same potential as that of another phase, and a converter which converts the direct current converted on the basis of the aforesaid regenerative signal into an alternating current, and regenerates it to the aforesaid power source.

The aforesaid inverter transforms induction electromotive force caused in regenerating the power source, namely in decelerating the motor, into a direct current. The aforesaid timing adjusting means outputs a regenerative signal at a predetermined timing before the potential of one phase indicative of the maximum potential in three-phase supply voltages becomes the same potential as that of another phase. Based on the regenerative signal, the aforesaid converter converts the direct current transformed in regenerating the power source into the alternating current, and regenerates it to the power source.

BRIEF DESCRIPTION OF THE DRAWINGS

FIG. 3(A) shows a light-emitting circuit section and FIG. 3(B) shows a light-receiving circuit section;

DETAILED DESCRIPTION OF THE PREFERRED EMBODIMENTS

One embodiment of the present invention will be described below with reference to the drawings.

Figure 1:
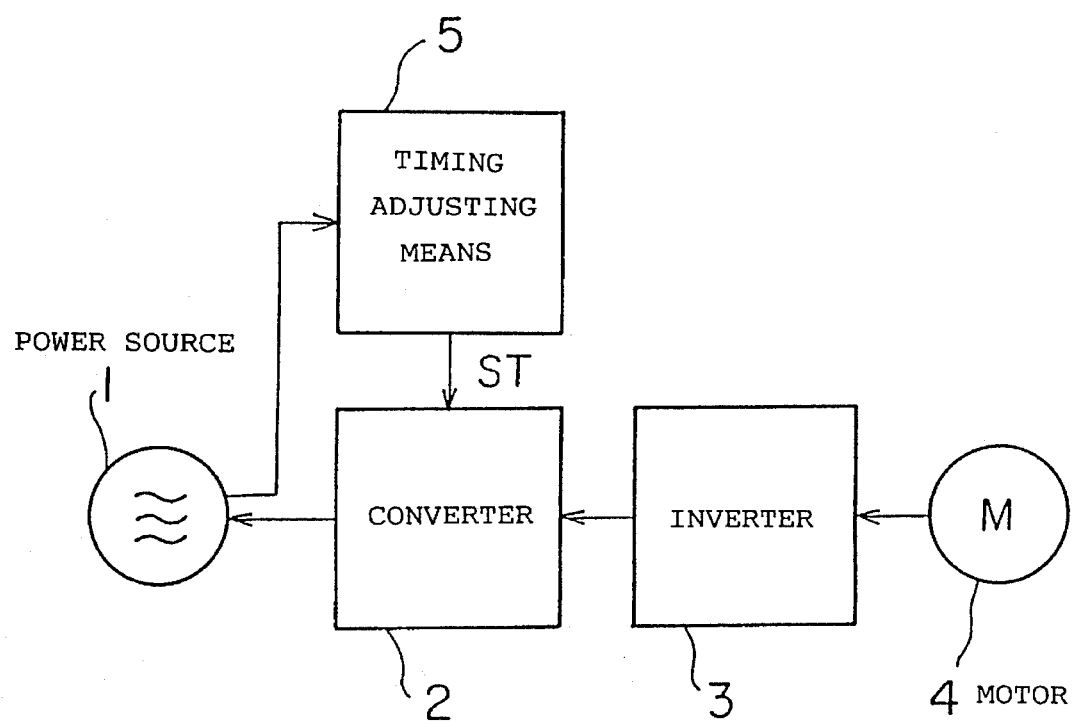
FIG. 1 is a block diagram explaining the principle of a power source regenerative apparatus according to the present invention.

FIG. 1 is a block diagram explaining the principle of a power source regenerative apparatus according to the present invention. The power source regenerative apparatus comprises a converter 2, an inverter 3 and timing adjusting means 5. The aforesaid converter 2 and inverter 3 are interposed between a power source 1 and a motor 4, and connected in series with each other. The aforesaid timing adjusting means 5 inputs three-phase supply voltages from the power source 1, and outputs a regenerative signal ST to the converter 2 at a predetermined timing.

The inverter 3 transforms induction electromotive force caused in regenerating the power source, namely in decelerating the motor 4, into a direct current. The timing adjusting means 5 outputs the regenerative signal ST at a predetermined timing before the potential of one phase indicative of the maximum potential in three-phase supply voltages becomes the same potential as that of another phase. Based on the regenerative signal ST, the converter 2 converts the direct current transformed in regenerating the power source into an alternating current, and regenerates it to the power source.

Figure 2:
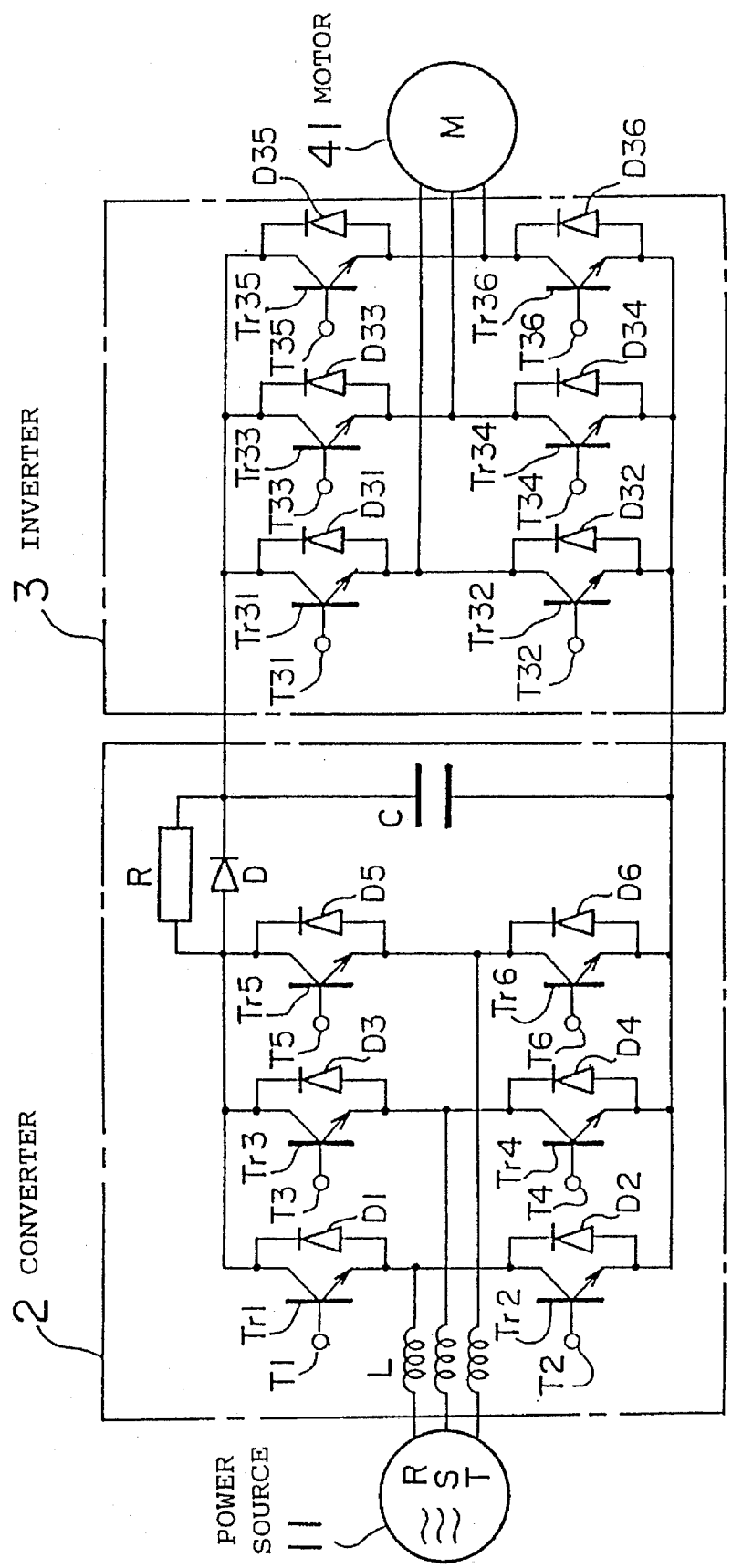
FIG. 2 is a circuit diagram of the power source regenerative apparatus.
Figure 3:
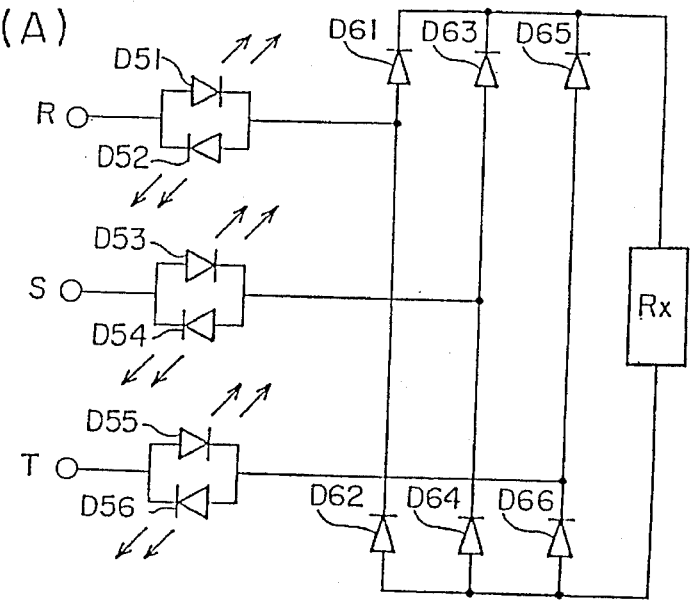
FIGS. 3(A) and 3(B) are circuit diagrams of the power source regenerative apparatus.
Figure 3:
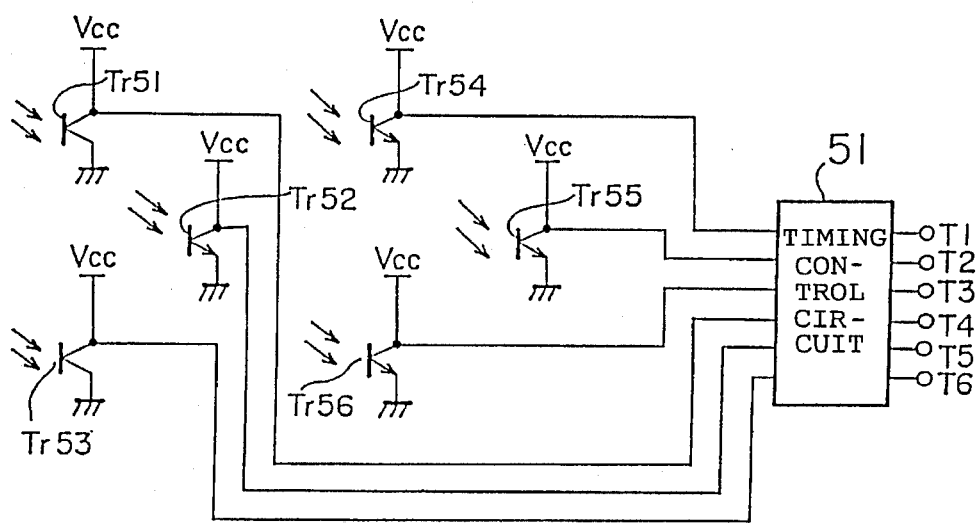

FIGS. 2, 3(A) and 3(B) are circuit diagrams for the power source regenerative apparatus. FIG. 2 shows each circuit of the inverter and the converter of the power source regenerative apparatus. FIGS. 3(A) and 3(B) show a light-emitting circuit and a light-receiving circuit of the timing adjusting means of the power source regenerative apparatus, respectively.

First, the circuit configuration of FIG. 2 will be explained below. In the figure, the converter 2 and the inverter 3 are connected in series between a power source 11 and a motor 41. In this case, a three-phase commercial power source is used as the power source 11, and a servo motor is used as the motor 41.

The circuit configuration of the converter 2 will be described below. Transistors Tr1 and Tr2 are connected in series with each other. More specifically, an emitter terminal of the transistor Tr1 and a collector terminal of the transistor Tr2 are connected with each other, and the junction point is connected to the R-phase of the power source 11 through an inductance L. Likewise, an emitter terminal of the transistor Tr3 and a collector terminal of the transistor Tr4 are connected with each other, and the junction point is connected to the S-phase of the power source 11 through an inductance L. An emitter terminal of the transistor Tr5 and a collector terminal of the transistor Tr6 are connected with each other, and the junction point is connected to the T-phase of the power source 11 through an inductance L.

Further, transistors Tr1 and Tr2, Tr3 and Tr4, and Tr5 and Tr6, which are connected in series, are connected in parallel. More specifically, collector terminals of transistors Tr1, Tr3 and Tr5 are connected with each other, and one terminal of a regenerative current limiting resistor R and an anode terminal of a diode D are connected to the junction point. Likewise, emitter terminals of transistors Tr2, Tr4 and Tr6 are connected with each other. One terminal of a condenser C is connected in parallel to the junction point as in the connection between the transistors Tr1 and Tr2, and the other terminal of the condenser C is connected to the junction point between the other terminal of the aforesaid regenerative current limiting resistor R and a cathode terminal of the diode D. In this case, the condenser C functions as a smoothing condenser for preventing a ripple from being generated in a current transformed into a direct current by the diode.

In addition, a diode is connected in parallel to each of these transistors Tr1 through Tr6. For example, a cathode terminal of a diode D1 is connected to the collector terminal of the transistor Tr1, and an anode terminal of the diode D1 is connected to the emitter terminal of the transistor Tr1. Likewise, diodes D2, D3, D4, D5 and D6 are connected in parallel to transistors Tr2, Tr3, Tr4, Tr5 and Tr6, respectively. Incidentally, base terminals of these transistors Tr1 through Tr6 are connected to a timing controlling circuit which will be described later.

Next, the circuit configuration of the inverter 3 will be explained below. Transistors Tr31 and Tr32 are connected in series. Specifically, an emitter terminal of the transistor Tr31 and a collector terminal of the transistor Tr32 are connected, and the junction point is connected to the motor 41. Likewise, an emitter terminal of a transistor Tr33 and a collector terminal of a transistor Tr34 are connected, and the junction point is connected to the motor 41. An emitter terminal of a transistor Tr35 and a collector terminal of a transistor Tr 36 are connected, and the junction point is connected to the motor 41.

In addition, the transistors Tr31 and Tr32, Tr33 and Tr34, and Tr35 and Tr36, which are connected in series, are connected in parallel. Specifically, the collector terminals of transistors Tr31, Tr33 and Tr35 are connected with each other, and the junction point is connected with the aforesaid other terminal of the condenser C. Likewise, the emitter terminals of transistors Tr32, Tr34 and Tr36 are connected with each other, and the junction point is connected with the aforesaid one terminal of the condenser C.

Further, a diode is connected in parallel to each of these transistors Tr31 through Tr36. For example, a cathode terminal of a diode D31 is connected to the collector terminal of the transistor Tr31, and an anode terminal of the diode D31 is connected to the emitter terminal of the transistor Tr31. Likewise, diodes D32, D33, D34, D35 and D36 are connected in parallel to the transistors Tr32, Tr33, Tr34, Tr35 and Tr36, respectively.

The circuit configuration shown in FIGS. 3(A) and 3(B) will be described below. FIG. 3(A) and FIG. 3(B) show a light emitting circuit and a light receiving circuit, respectively. In FIG. 3(A) and FIG. 3(B), a light emitting diode D51 and a phototransistor Tr51 constitute one photocoupler. More specifically, the light emitting diode D51 emits light when a forward current flows thereto, and the phototransistor Tr51 is turned on when receiving the emitted light. Likewise, each of light emitting diodes D52 to D56 and each of phototransistors Tr52 to Tr56 constitute one photocoupler.

In FIG. 3(A), a diode D62 is connected in series to a diode D61. More specifically, a cathode terminal of the diode D62 is connected to an anode terminal of the diode D61. The light emitting diodes D51 and D52 are connected in parallel and in the reverse direction to each other. Namely, an anode terminal of the light emitting diode D52 is connected to a cathode terminal of the light emitting diode D51, and the junction point is connected to the junction point between the aforesaid anode terminal of the diode D61 and the aforesaid cathode terminal of the diode D62.

Likewise, diodes D64 and D66 are connected in series to diodes D63 and D65, respectively. The light emitting diodes D53 and D54 are connected in parallel and in the reverse direction to each other, and the light emitting diodes D55 and D56 are connected in parallel and in the reverse direction to each other. The junction point between the cathode terminal of the light emitting diode D53 and the anode terminal of the light emitting diode D54 is connected with the junction point between the anode terminal of the light emitting diode D63 and the cathode terminal of the light emitting diode D64. The junction point between the cathode terminal of the light emitting diode D55 and the anode terminal of the light emitting diode D56 is connected with the junction point between the anode terminal of the light emitting diode D65 and the cathode terminal of the light emitting diode D66.

Further, cathode terminals of the diodes D61, D63 and D65 are connected to one terminal of a load resistor Rx, and anode terminals of the diodes D62, D64 and D66 are connected to the other terminal of the load resistor Rx.

In FIG. 3(B), respective collector terminals of phototransistors Tr51 through Tr56 are connected to a constant-voltage source Vcc, and further connected to a timing control circuit 51. The timing control circuit 51 outputs a regenerative signal ST while monitoring a regenerative current which will be described later. The regenerative signal ST outputted from the timing control circuit 51 is supplied to a base terminal of each corresponding transistor shown in FIG. 2 through terminals T1, T2, T3, T4, T5 and T6.

Therefore, for example, the light emitting diode D51 shown in FIG. 3(A) emits light when a forward current flows thereto, thereby the phototransistor Tr51 of FIG. 3(B) being turned on. For this reason, a voltage of the collector terminal of the phototransistor Tr51 becomes almost 0 [V], and the potential thereof is transmitted to the timing control circuit 51 as a signal. Likewise, light emitting diodes D51, D52, D53, D54, D55 and D56 of FIG. 3(A) respectively correspond to phototransistors Tr51, Tr52, Tr53, Tr54, Tr55 and Tr56 of FIG. 3(B). As described above, the timing control circuit 51 detects timing of the supply voltage supplied from the power source 11, and outputs the regenerative signal ST at a predetermined timing which will be described later.

The operation of a power source regenerative apparatus according to the present invention will be described below.

Figure 4:
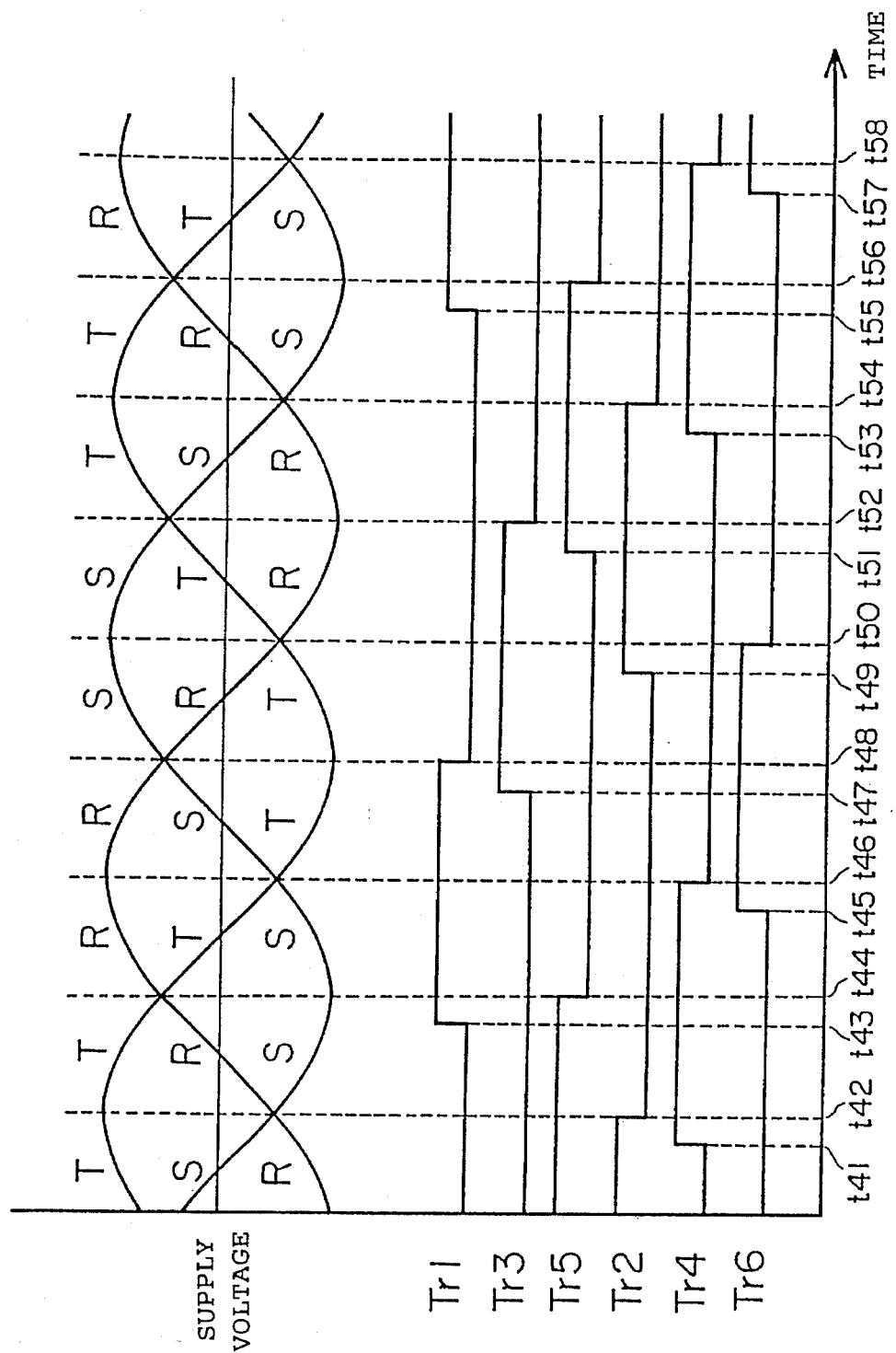
FIG. 4 is a time chart showing an on/off state of each transistor.

FIG. 4 is a time chart showing an on/off state of each transistor, showing a change at each time of respective transistors Tr1 through Tr6, which corresponds to a change of the supply voltage.

In the figure, each of the transistors Tr1, Tr3 and Tr5 is used as a transistor which becomes an on-state by selecting the phase indicative of the maximum potential in three-phase (R-phase, S-phase, T-phase) supply voltage; on the other hand, each of the transistors Tr2, Tr4 and Tr6 is used as a transistor which becomes an on-state by selecting the phase indicative of the minimum potential in three-phase supply voltage.

More specifically, the transistor Tr1 becomes an on-state in the case where the potential of R-phase is the maximum, and an off-state in other cases. Likewise, the transistors Tr3 and Tr5 become an on-state in the case where each potential of S-phase and T-phase is the maximum, and an off-state in other cases, respectively. In addition, the transistor Tr2 becomes an on-state in the case where the potential of R-phase is the minimum, and an off-state in other cases. Likewise, the transistors Tr4 and Tr6 become an on-state in the case where each potential of S-phase and T-phase is the minimum, and an off-state in other cases, respectively.

For example, the potential of R-phase becomes the maximum, and the potential of S-phase becomes the minimum, between time t44 and time t46; therefore, transistors Tr1 and Tr4 become an on-state, and other transistors become an off-state. Likewise, the potential of R-phase becomes the maximum, and the potential of T-phase becomes the minimum, between time t46 and time t48; therefore, the transistors Tr1 and Tr6 become an on-state, and other transistors become an off-state.

In this case, the minimum potential changes from the S-phase to the T-phase at the time t46, so that the transistor Tr6 is turned on at the time t45, and turned off at the time t46. Likewise, the maximum potential changes from the R-phase to the S-phase at the time t48, so that the transistor Tr3 is turned on at the time t47, and the transistor Tr1 is turned off at the time t48. As described above, transistors are turned on or off at each time of t41, t42, ..., t58.

Incidentally, the intervals from time t41 to time t42, from time t43 to time t44, ..., from time t57 to time t58, are the same, and varied in accordance with the inductance of a power source and an inductance L.

Figure 5:
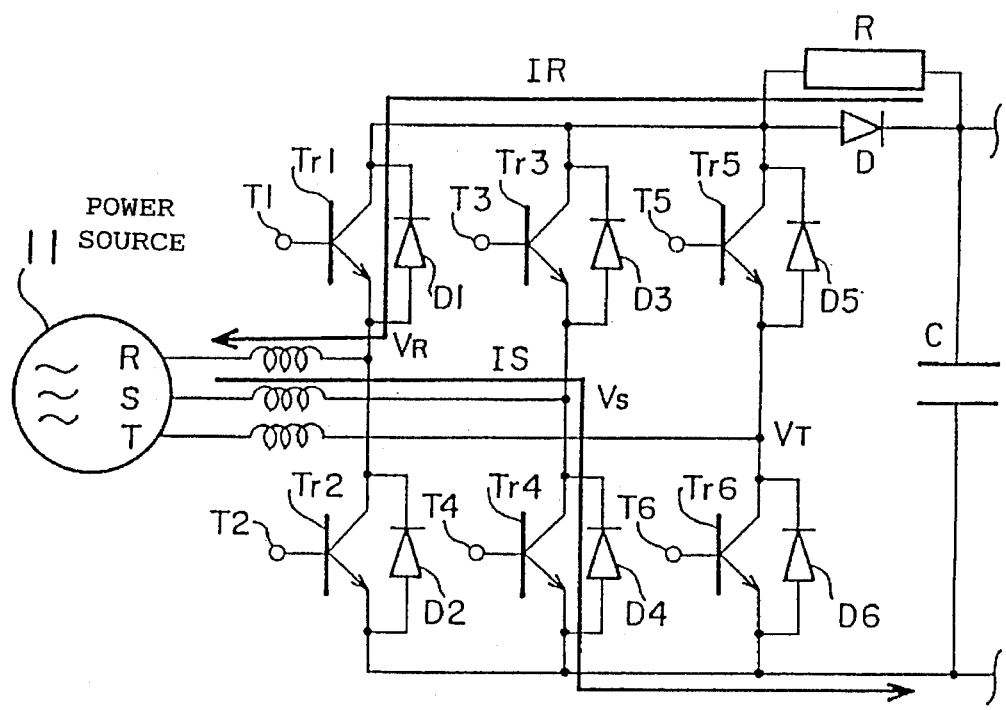
FIG. 5 is a circuit diagram showing the flow of a regenerative current.
Figure 6:
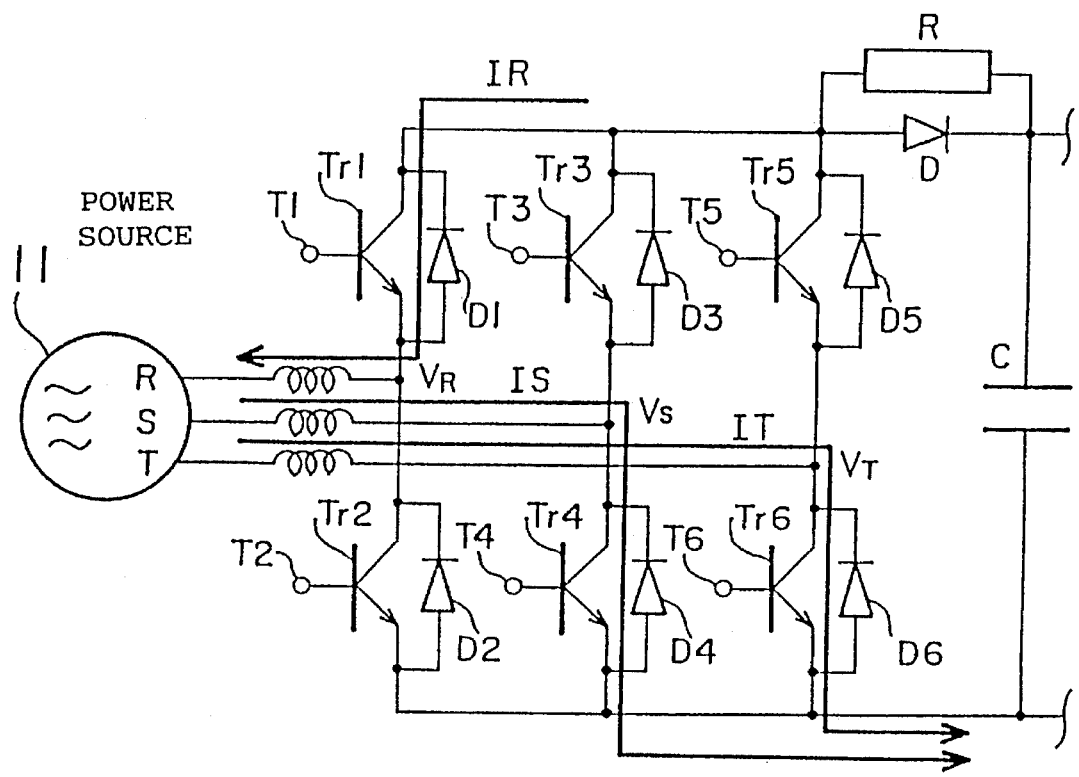
FIG. 6 is a circuit diagram showing the flow of a regenerative current.
Figure 7:
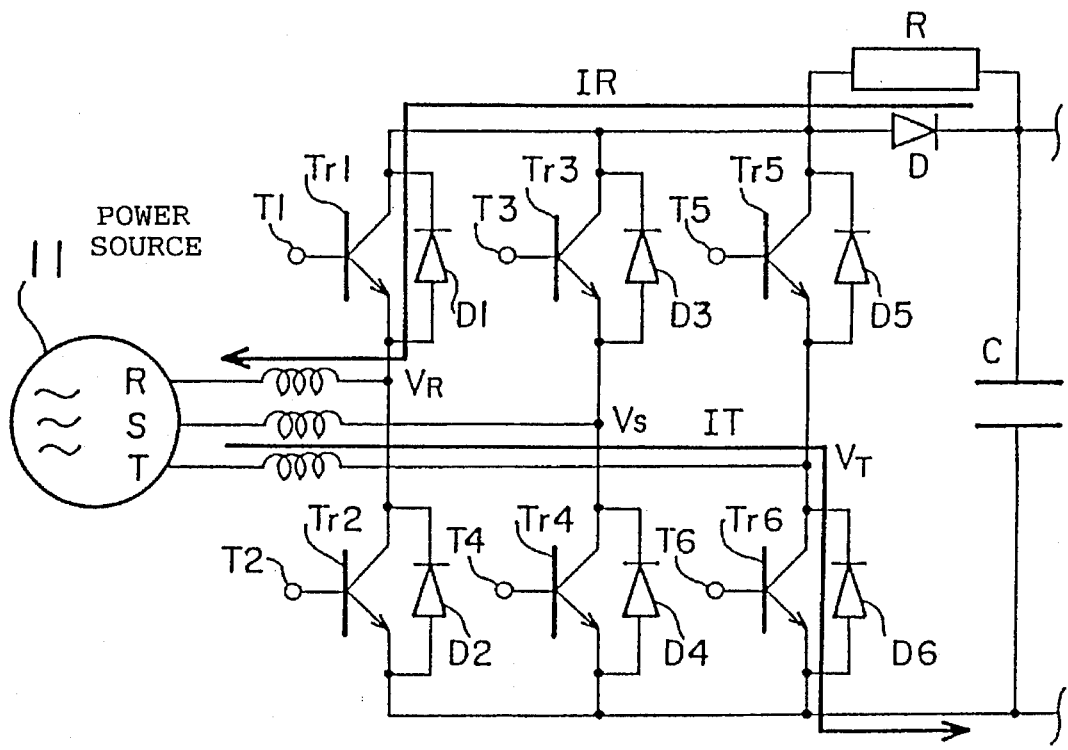
FIG. 7 is a circuit diagram showing the flow of a regenerative current.

FIGS. 5 through 7 are circuit diagrams showing the flow of regenerative current, showing the flow of a regenerative current in a power source and a converter. FIGS. 5, 6 and 7 show the flow of the regenerative current before the phase is switched, the flow of the regenerative when the phase is switched, and the flow of the regenerative current after the phase is switched, respectively. More specifically, FIGS. 5, 6 and 7 show the flow of the regenerative current between time t44 and time t45 in FIG. 4, the flow of the regenerative current between time t45 and time t46 in FIG. 4, and the flow of the regenerative current between time t46 and time t47 in FIG. 4, respectively.

The flow of the regenerative current at each time will be described below.

First, a current by induction electromotive force caused in decelerating the motor (not shown) flows into both terminals of the aforesaid condenser C, so that the potential of both terminals of the condenser C rises up. At this moment, the potential of one phase indicative of the maximum potential in three-phase supply voltages supplied from the power source 11 becomes lower than that of one terminal of the condenser C, and the potential of one phase indicative of the minimum potential in three-phase supply voltages becomes higher than that of the other terminal of the condenser C. Therefore, a potential difference occurs between the supplied three-phase supply voltage and the condenser C, so that a regenerative current which flows to the power source 11 from the condenser C is generated. The regenerative current generated by the foregoing phenomenon is hereinafter referred to as "regenerative current in decelerating."

In FIG. 5, the regenerative current in decelerating flows into the power source 11 as the phase current IR through the regenerative current limiting resistor R and the transistor Tr1. Incidentally, the potential of T-phase at this moment is $V_T$. Further, the regenerative current in decelerating flows into the condenser C as the phase current IS through the transistor Tr4 because the potential $V_S$ of S-phase is lower than the potential $V_T$ of T-phase, and the transistor Tr4 is turned on.

In FIG. 6, the regenerative current in decelerating flows into the power source through the transistor Tr1 and the diode D3 because the transistor Tr4 is turned off, by which counter electromotive force occurs in the input inductance L.

In FIG. 7, the regenerative current in decelerating flows into the power source 11 as the phase current IR through the regenerative current limiting resistor R and the transistor Tr1. Further, the regenerative current in decelerating flows into the motor (not shown) as the phase current IT through the transistor Tr6 because the potential $V_T$ of T-phase is lower than the potential $V_S$ of S-phase, and the transistor Tr6 is turned on.

Figure 8:
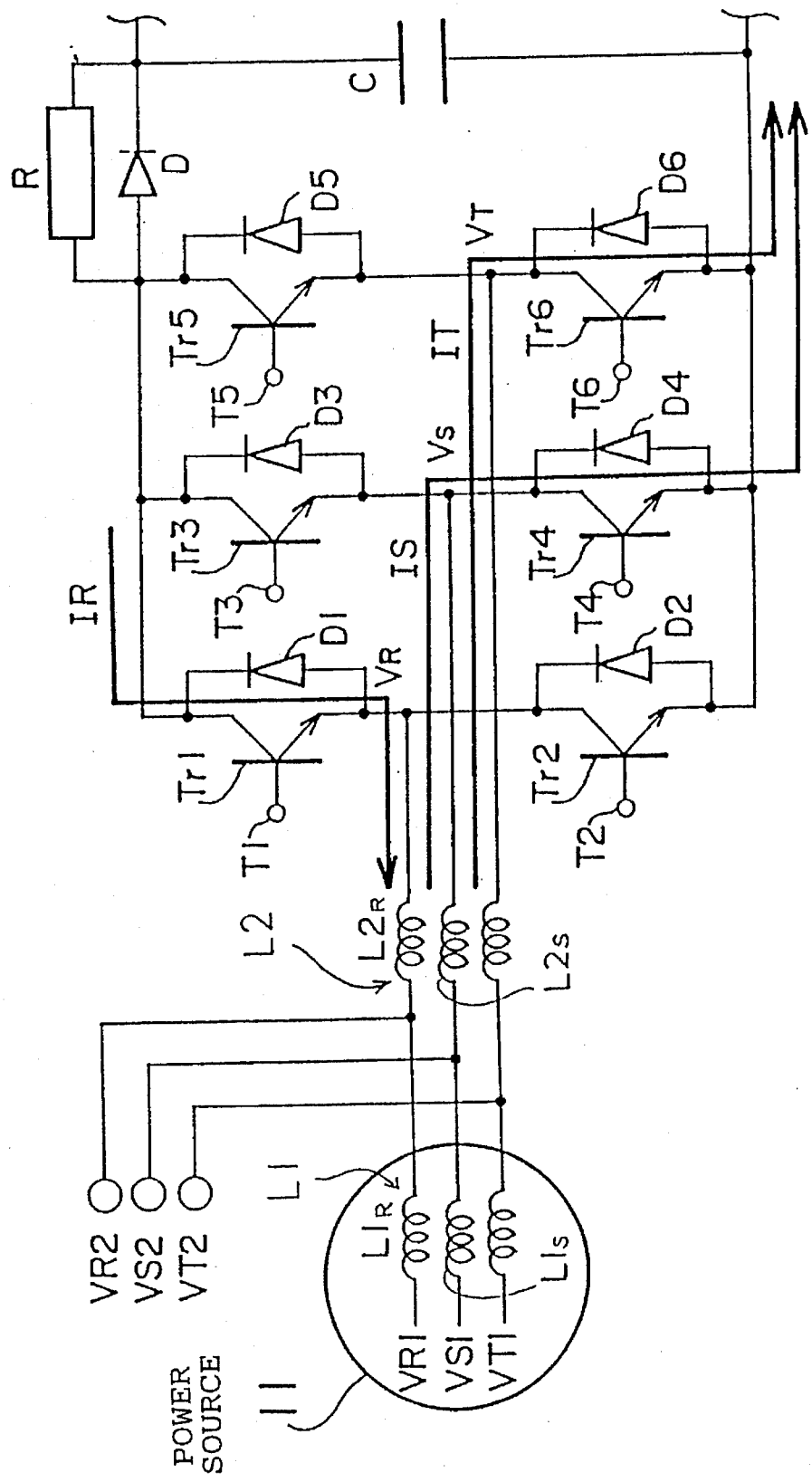
FIG. 8 is a circuit diagram showing the flow of a regenerative current in switching a phase.

FIG. 8 is a circuit diagram showing the flow of a regenerative current when the phase is switched. In the figure, inductances L1 and L2 show inductance of the power source, and inductance of the converter 2, respectively. In addition, potentials VR1, VS1 and VT1 show the potential of the supply voltage, and potentials VR2, VS2 and VT2 show the potential of other apparatuses connected to the supply voltage. Incidentally, the same number is given to the same element as that in FIG. 6, and an explanation of the element is omitted.

The regenerative current in decelerating flows into the power source 11 as the phase current IR through the regenerative current limiting resistor R and the transistor Tr1. Further, the regenerative current in decelerating flows into the motor (not shown) as the phase current IS through the transistor Tr4, and flows into the motor (not shown) as the phase current IT through the transistor Tr6. In other words, a voltage reverse to the current direction is applied to the inductances $L1_S$ and $L2_S$; for this reason, the phase current IS decreases. Therefore, if the timing adjusting means 5 outputs a regenerative signal ST so as to turn the transistor Tr4 off when the phase current IS becomes zero, no flywheel current flows, and it is possible to prevent distortion of a voltage generating in the power source from being caused.

Figure 9:
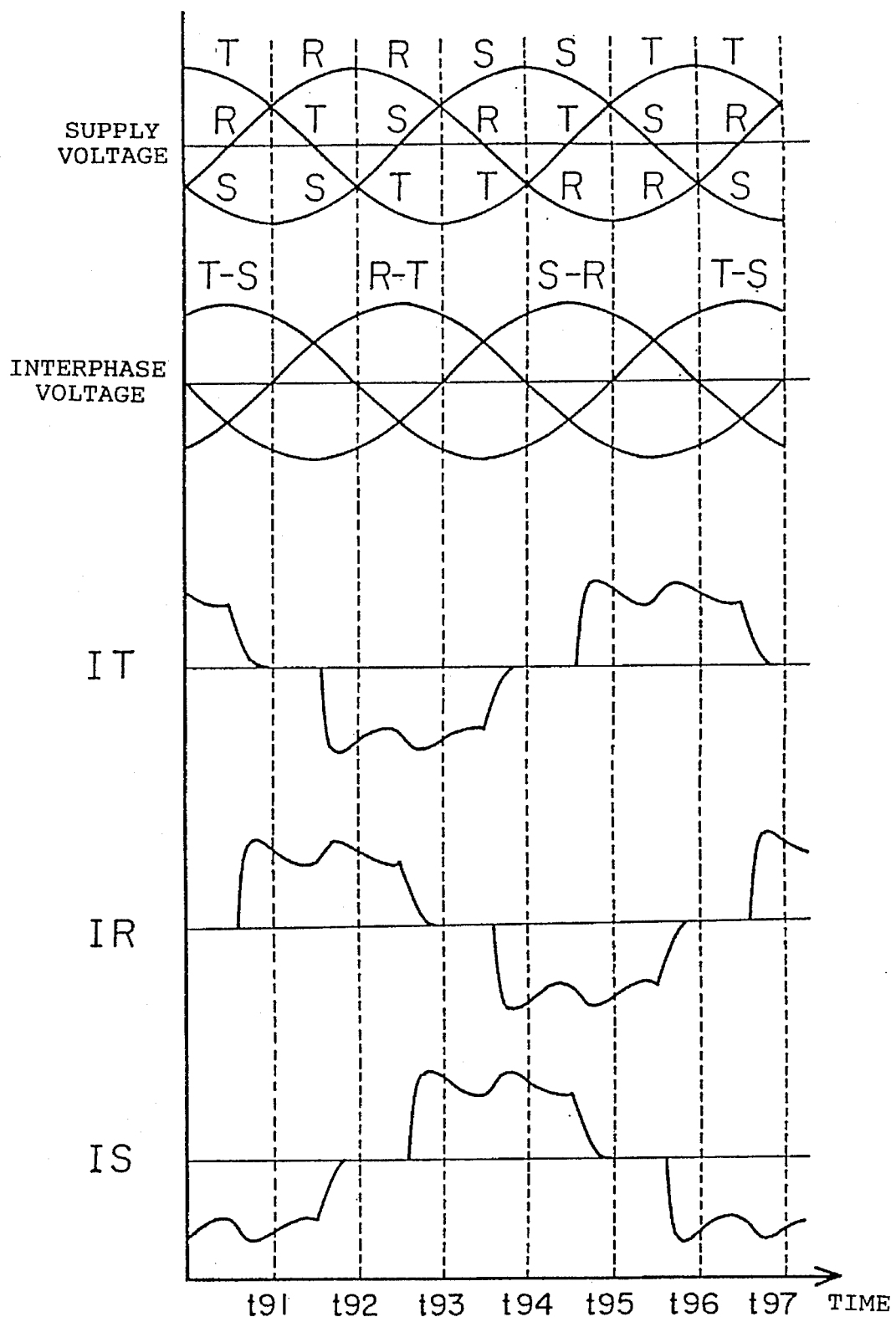
FIG. 9 is a time chart of the regenerative current.
Figure 10:
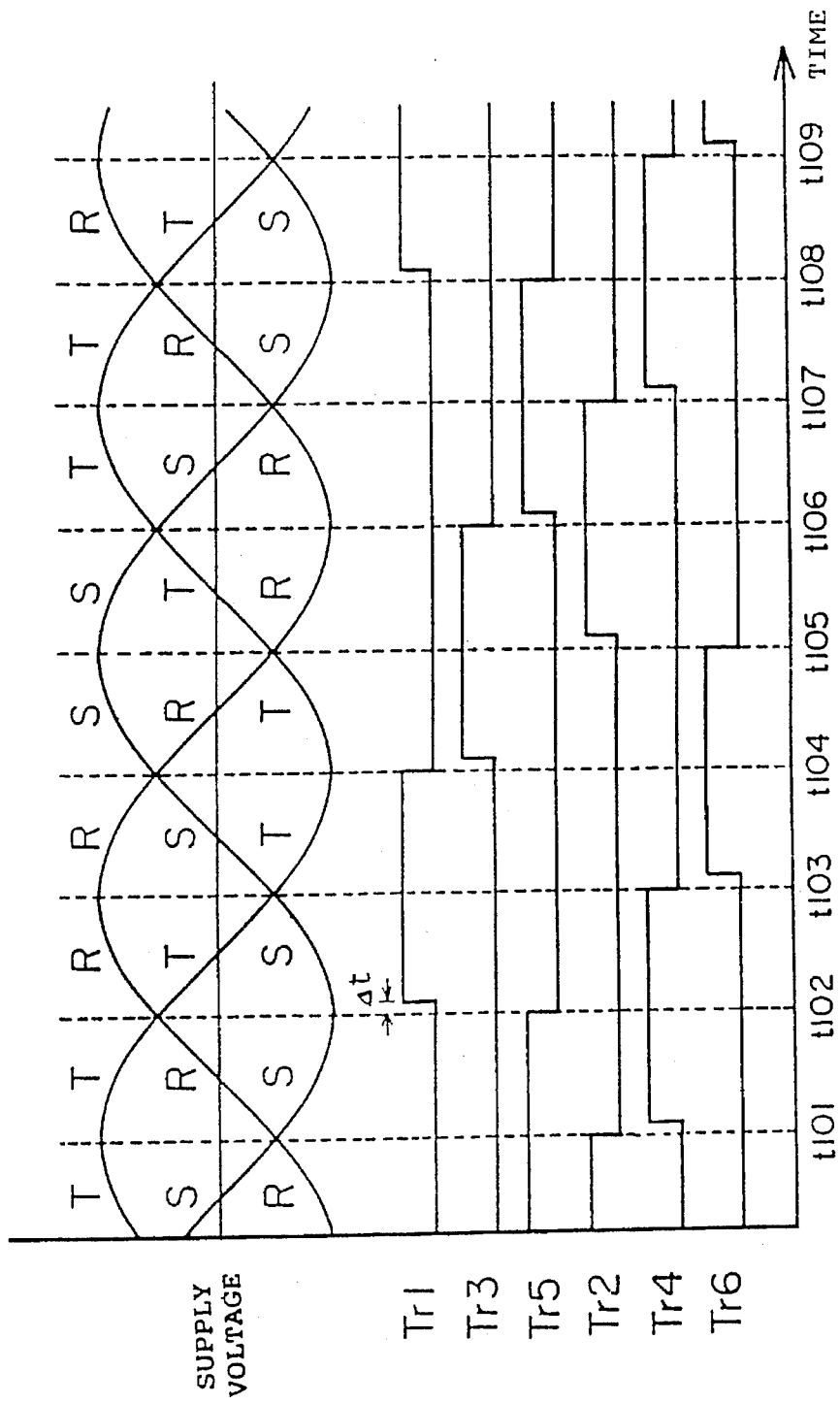
FIG. 10 is a time chart showing an on/off state in each transistor of a conventional converter.
Figure 11:
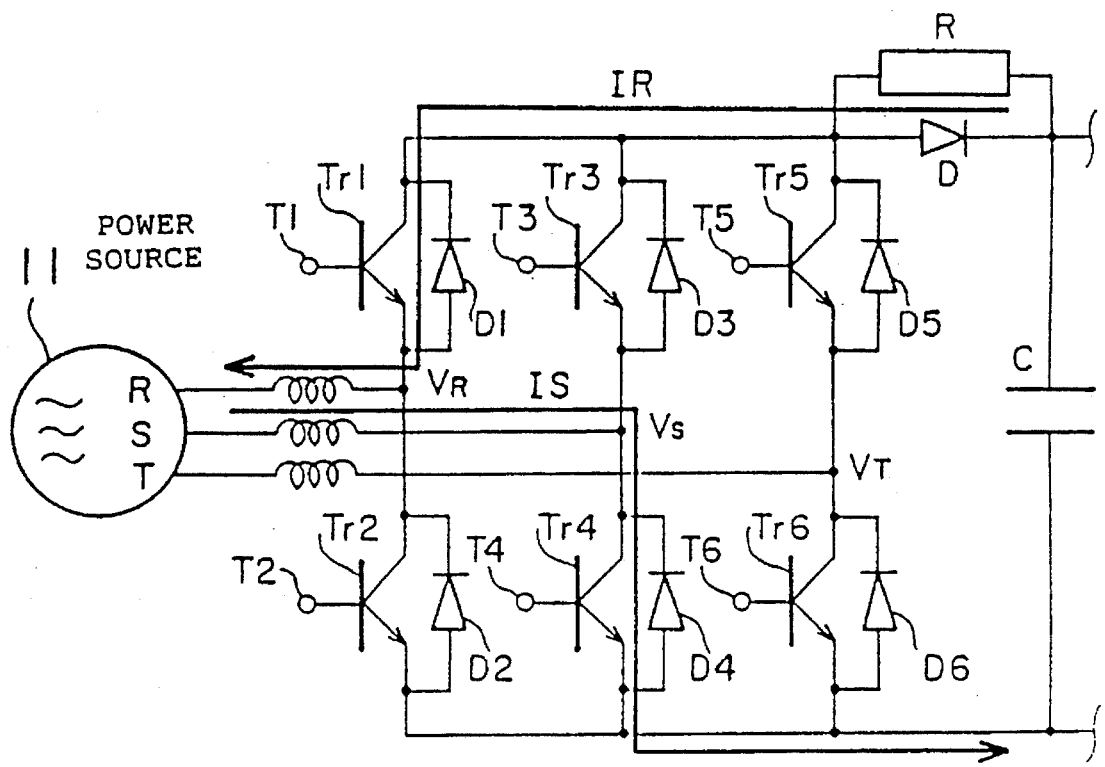
FIG. 11 is a circuit diagram showing the flow of a conventional regenerative current.
Figure 12:
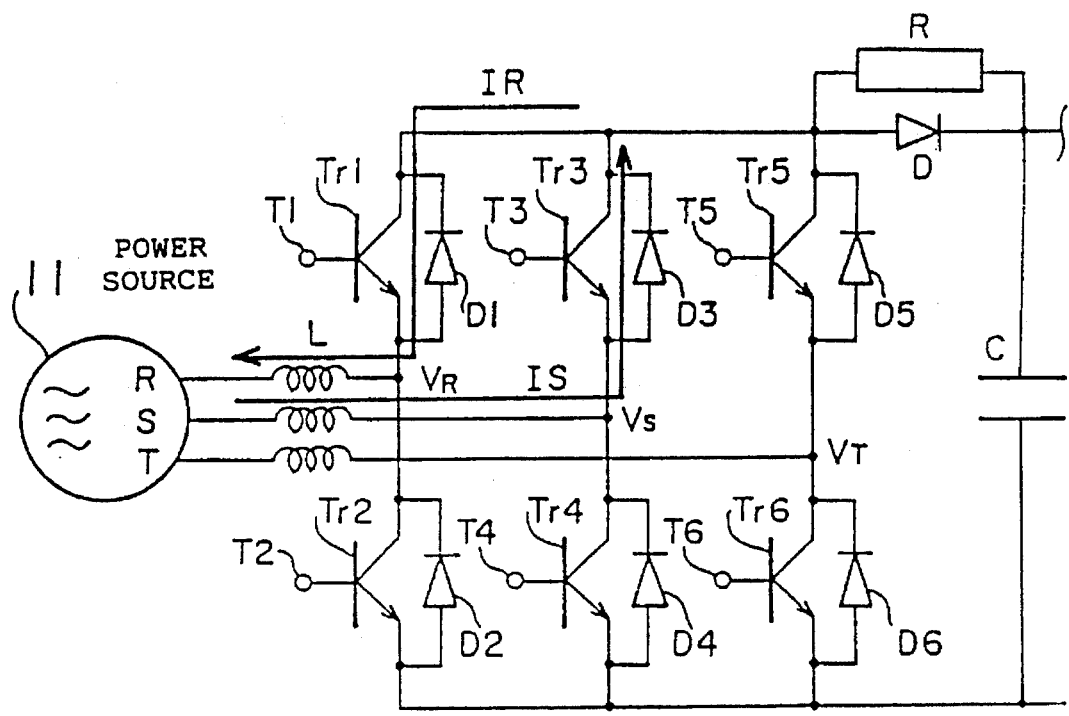
FIG. 12 is a circuit diagram showing the flow of a conventional regenerative current.
Figure 13:
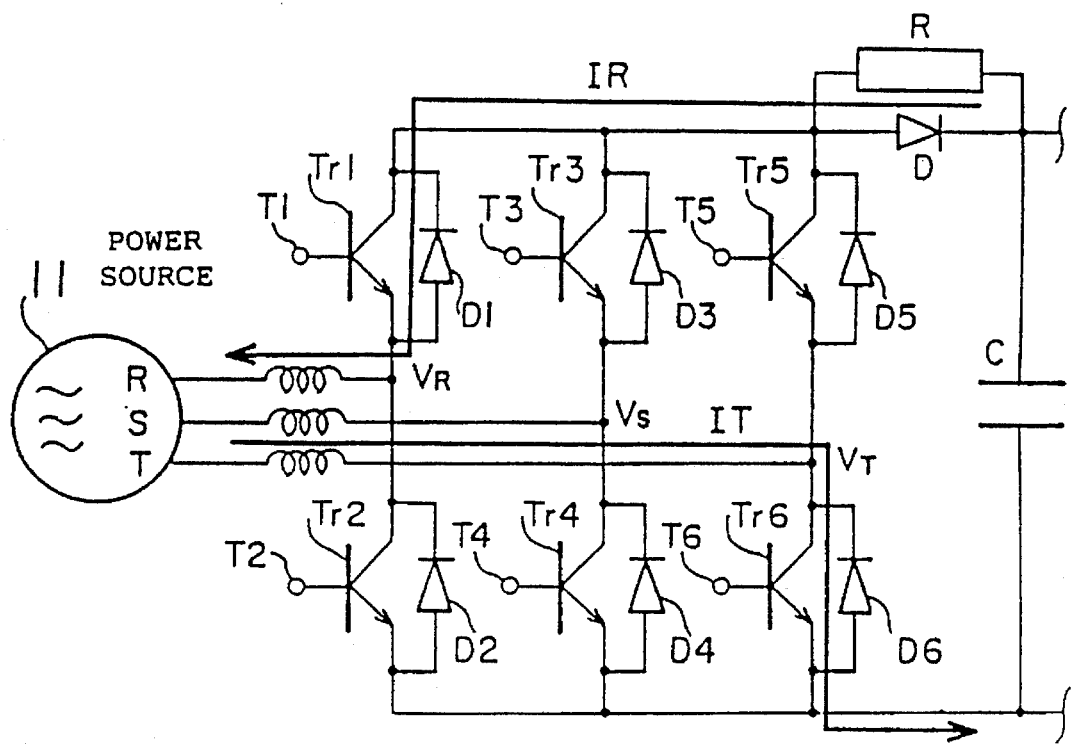
FIG. 13 is a circuit diagram showing the flow of a conventional regenerative current.
Figure 14:
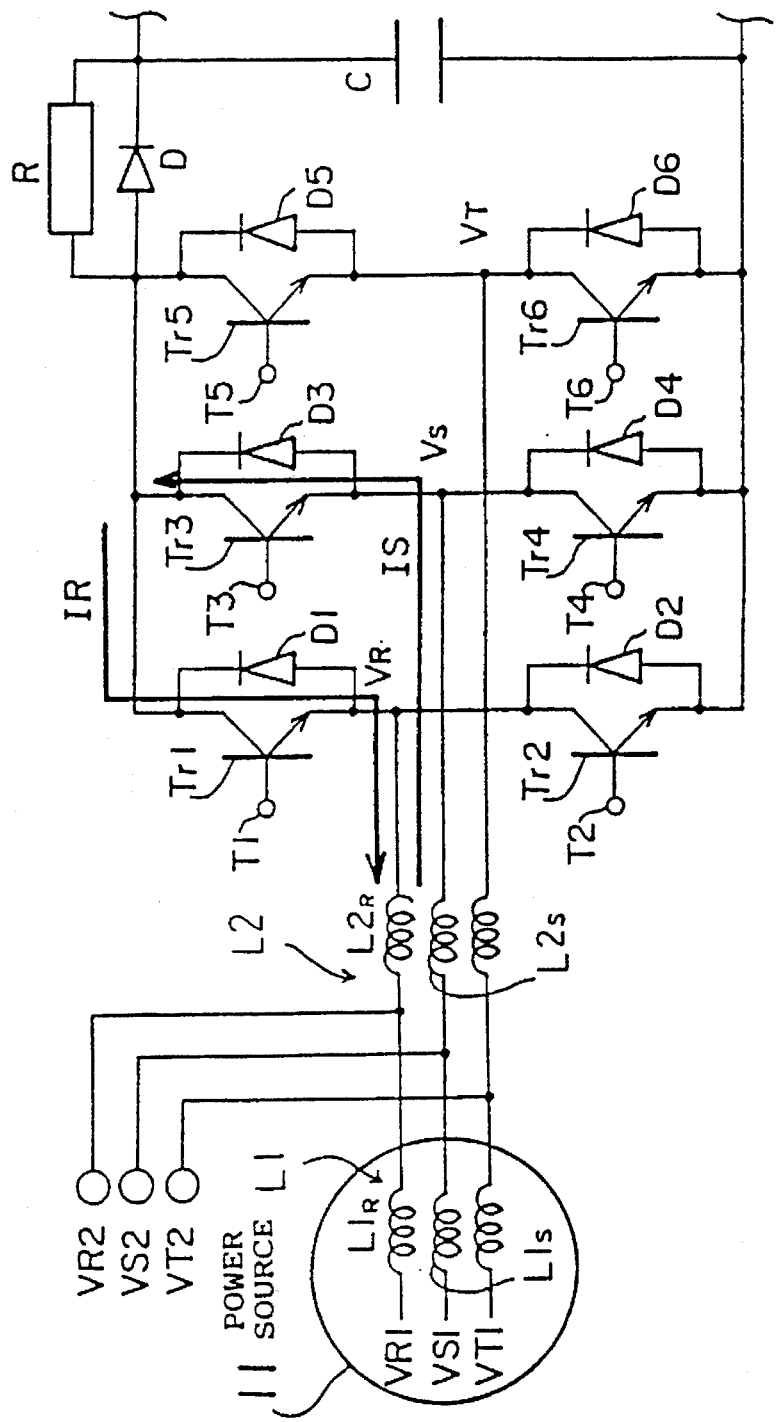
FIG. 14 is a circuit diagram showing the flow of a conventional regenerative current in switching a phase.
Figure 15:
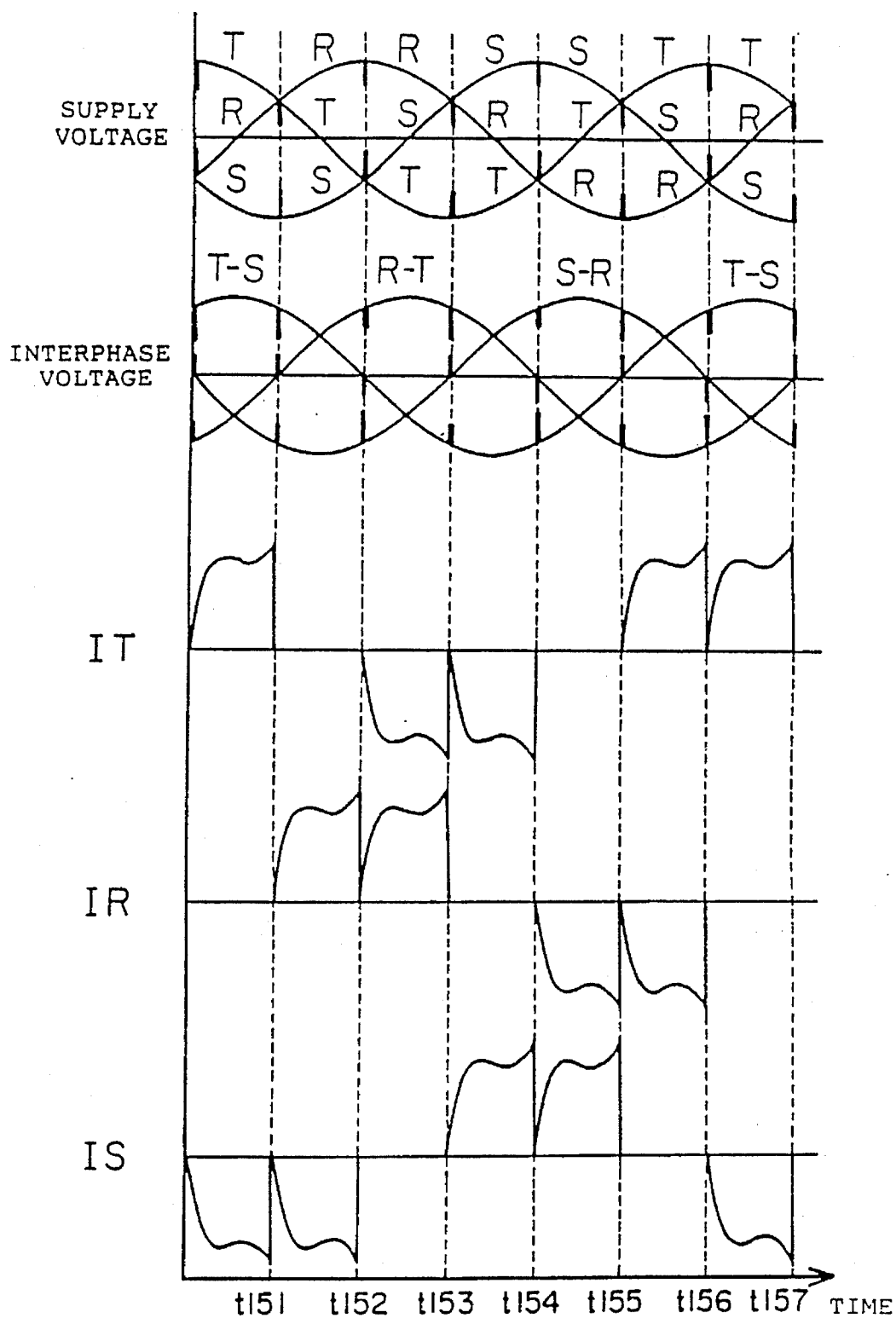
FIG. 15 is a time chart showing a conventional regenerative current.

FIG. 9 is a time chart of the regenerative current, showing a change at each time of interphase voltage and phase currents IT, IR and IS, which corresponds to a change of the supply voltage.

The aforesaid timing adjusting means 5 outputs a regenerative signal ST at the following timing. Namely, the regenerative signal ST is outputted so that when the potential of one phase indicative of the maximum potential in three-phase supply voltage becomes the same potential as that of another phase, the phase current of the aforesaid one phase indicative of the maximum potential becomes zero.

More specifically, for example, the R-phase is indicative of the maximum voltage in three phases between time t91 and time t93. The potentials of the R-phase and the S-phase become equal at the time t93. Therefore, the regenerative current ST may be outputted so that the phase current IR which is a current having the same phase as the phase indicative of the maximum potential becomes 0 [A] at the time t93.

Although a servo motor is used as the motor 41, other three-phase AC motor such as a spindle motor can be also used.

As described above, according to the present invention, the inverter transforms induction electromotive force caused in regenerating the power source, namely in decelerating the motor, into a direct current, the timing adjusting means outputs a regenerative signal at a predetermined timing, and the converter converts the transformed direct current into an alternating current without causing a fly-wheel current, and further regenerates it to the power source. Therefore, it is possible to prevent distortion of a voltage regenerating in the power source from being caused, and no harmonic occurs in the power source.

We claim:

1. A power source regenerative apparatus for regenerating induction electromotive force caused in decelerating a motor to a power source, comprising:

an inverter for transforming an induction electromotive force, caused in decelerating the motor, into a direct current, to regenerate the power source;

timing adjusting means for outputting a regenerative signal at a predetermined timing before the potential of one phase indicative of the maximum potential in three-phase supply voltages becomes the same potential as that of another phase; and a converter for converting the direct current into an alternating current based on said regenerative signal, and for regenerating said alternating current to said power source.

2. A power source regenerative apparatus according to claim 1, wherein said timing adjusting means adjusts a timing so that when the potential of one phase indicative of the maximum potential in three-phase supply voltages becomes the same potential as that of another phase, said timing adjusting means makes the phase current of said one phase zero and outputs said regenerative signal.

* * * * *

UNITED STATES PATENT AND TRADEMARK OFFICE
CERTIFICATE OF CORRECTION

PATENT NO. : 5,491,392
DATED : February 13, 1996
INVENTOR(S) : Takashi HARADA, et al.

It is certified that error appears in the above-indentified patent and that said Letters Patent is hereby corrected as shown below:

Column 2, line 57, please change "Generated" to --generated--.

Column 5, line 25, please change "means" to --means 5--.

Signed and Sealed this

Twenty-eighth Day of May, 1996

Attest:

BRUCE LEHMAN

*Attesting Officer*  *Commissioner of Patents and Trademarks*